(12) United States Patent
Sugimoto et al.

(10) Patent No.: US 7,199,819 B2
(45) Date of Patent: Apr. 3, 2007

(54) DEVICE FOR AUTOMATICALLY DETECTING PICTURE DEGRADATION

(75) Inventors: Osamu Sugimoto, Saitama (JP); Ryoichi Kawada, Saitama (JP); Atsushi Koike, Saitama (JP); Masahiro Wada, Saitama (JP)

(73) Assignee: KDDI Corporation, Tokyo (JP)

( * ) Notice: Subject to any disclaimer, the term of this patent is extended or adjusted under 35 U.S.C. 154(b) by 548 days.

(21) Appl. No.: 10/781,632

(22) Filed: Feb. 20, 2004

(65) Prior Publication Data

US 2004/0183950 A1  Sep. 23, 2004

(30) Foreign Application Priority Data

Feb. 26, 2003   (JP)   ............... 2003-049769

(51) Int. Cl.
  *H04N 17/00*   (2006.01)
(52) U.S. Cl. ...................... 348/192; 348/193
(58) Field of Classification Search ............... 348/192, 348/193, 180, 189, 616, 617, 627, 607, 608; 382/262
See application file for complete search history.

(56) References Cited

U.S. PATENT DOCUMENTS

| | | | | |
|---|---|---|---|---|
| 4,797,735 A | * | 1/1989 | Takai et al. ............... | 348/192 |
| 5,329,311 A | * | 7/1994 | Ward et al. ............... | 348/180 |
| 5,446,492 A | * | 8/1995 | Wolf et al. ............... | 348/192 |
| 5,825,929 A | * | 10/1998 | Chen et al. ............... | 382/236 |
| 5,978,047 A | * | 11/1999 | May ............... | 348/616 |
| 6,603,505 B1 | * | 8/2003 | Kawada et al. ............... | 348/192 |

FOREIGN PATENT DOCUMENTS

| | | |
|---|---|---|
| JP | 2002-077949 | 3/2002 |
| JP | 2003-009186 | 1/2003 |

* cited by examiner

*Primary Examiner*—Michael H. Lee
(74) *Attorney, Agent, or Firm*—Westerman, Hattori, Daniels & Adrian, LLP.

(57) ABSTRACT

Feature quantities of a transmitted picture and a received picture are extracted from a first and second block-by-block feature quantity extraction parts which are provided on a transmitting and receiving sides, respectively. The extracted feature quantities are transmitted to a block degradation calculation part which compares the transmitted feature quantities and finds the degree of picture quality degradation for each block. Next, a median filter replaces the degree of picture quality degradation for the each block with a median of the degrees of picture quality degradation among the neighboring blocks of the each block. Then, a degraded block detection part compares the median with a predetermined threshold and detects a degraded block. Finally, a degraded region detection part removes an isolated degraded block and detects a degraded region. According to the invention, local picture quality degradation in a frame caused by transmission failure can be automatically detected with high accuracy.

8 Claims, 3 Drawing Sheets

DEVICE FOR AUTOMATICALLY DETECTING PICTURE DEGRADATION

BACKGROUND OF THE INVENTION

1. Field of the Invention

The present invention relates to a device for automatically detecting picture degradation that detects local picture or video degradation caused by transmission failure in picture or video transmission.

2. Description of the Related Art

One of conventional technologies for detecting local picture degradation caused by transmission failure in the video transmission is disclosed in Japanese Unexamined Patent Publication No. 2002-77949 applied by the present applicant.

This conventional technology is such that in a system having a plurality of transmission processing units connected in series to a transmission line, a feature quantity of a picture is extracted at a predetermined point on the video transmission circuit and is transmitted through a low bit-rate (data) circuit such as telephone network and LAN to a central monitoring apparatus and the central monitoring apparatus compares the feature quantity to evaluate transmitted picture quality.

However, the feature quantity obtained by the conventional technology is the average value, the variance and the like of brightness in the field of a received picture. Hence, in a case where picture quality degradation is caused by the transmission failure, it can be determined that the degree of degradation of a picture (frame) is high but it is impossible to specify a portion where the picture quality degradation is specifically caused.

Moreover, in a case where a degraded region in a frame is caused in an extremely small range, it is expected in some cases that even if the average value of degree of the picture quality degradation in the frame is obtained, the average value remains a high value and hence it cannot be determined that picture quality degradation is caused in the region. For this reason, there is required a method of specifying a portion in the frame where picture quality degradation is caused.

SUMMARY OF THE INVENTION

An object of the invention is to provide a device for automatically detecting picture degradation that can detect local degradation in a frame caused by transmission failure with high accuracy.

In order to achieve the object, the invention is characterized in that a device for automatically detecting picture degradation caused by video transmission comprises a first feature quantity extraction part that is provided on a transmitting side and extracts a feature quantity in a small region in a frame, a second feature quantity extraction part that is provided on a receiving side and extracts a feature quantity in the small region in the frame, and a monitoring chamber that receives the feature quantities extracted by the first and second feature quantity extraction parts through a low bit-rate (data) circuit, wherein the monitoring chamber includes a degradation calculation part that compares the feature quantities received from the first and second feature quantity extraction parts and finds a degree of picture quality degradation, and a median filter that defines a median of the degree of picture quality degradation among a small region to be noticed and the small regions in a predetermined range near the small region to be noticed as the degree of picture quality degradation of the small region to be noticed, and can detect local picture quality degradation of a picture.

According to the invention, local degradation in a frame caused by transmission failure is automatically detected with high accuracy.

DETAILED DESCRIPTION OF THE PREFERRED EMBODIMENTS

Figure 1:
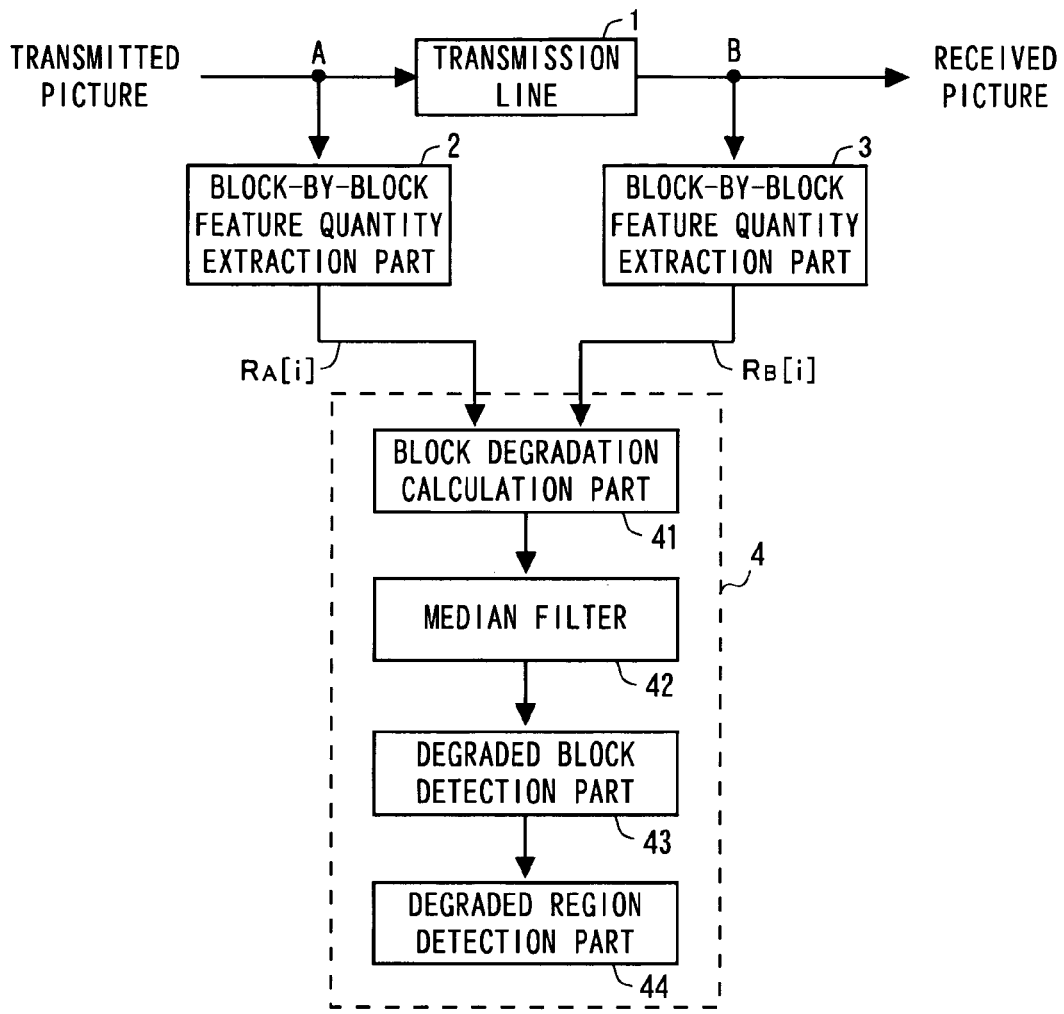
FIG. 1 is a block diagram showing the schematic construction of one embodiment of the invention.

The invention will be hereinafter described in detail with reference to the drawings. The preferred embodiment of the invention will be described with reference to FIG. 1. FIG. 1 is a block diagram showing the schematic construction of the invention.

A transmitted picture is transmitted from a transmitting side to a receiving side through a transmission line 1. A first block-by-block feature quantity extraction part 2 and a second block-by-block feature quantity extraction part 3 are provided respectively at a point A on the transmitting side and a point B on the receiving side of the transmission line 1.

Each of the first and second block-by-block feature quantity extraction parts 2, 3 divides the frame of a transmitted picture or a received picture into small regions or pixel blocks and extracts a picture feature quantity from this pixel block. The pixel block to be used is 8 pixels×8 pixels or 16 pixels×16 pixels. The extracting of the picture feature quantity is preferably made by a coefficient extraction method based on spread spectrum and orthogonal transformation disclosed in Japanese Patent Application No. 2002-55333 applied by the present applicant but is not limited to this coefficient extraction method. However, the invention can be applied not only to the feature quantity extracted by this method but also to a feature quantity of the type in which the noise power (MSE) of the block can be estimated by comparing the feature quantity between the transmitting side and the receiving side.

Figure 2:
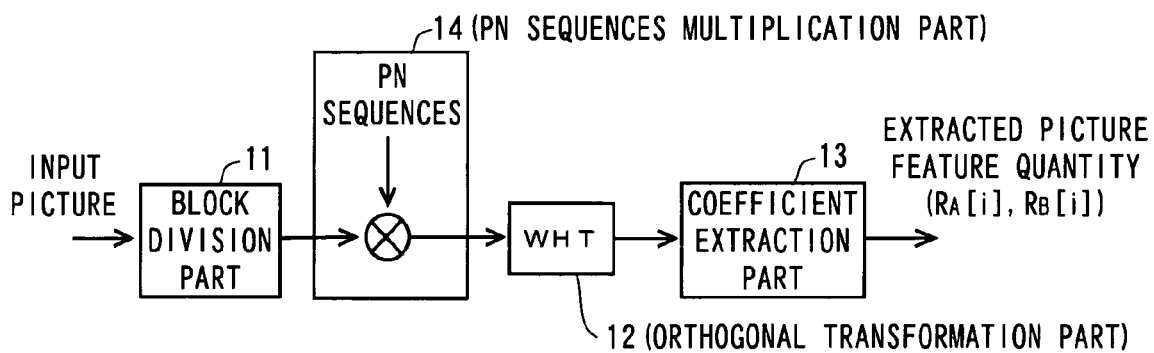
FIG. 2 is a block diagram showing the concrete construction example of a block-by-block feature quantity extraction part in FIG. 1.

Here, the coefficient extraction method disclosed in the above Japanese Patent Application will be described in brief with reference to FIG. 2.

First, an input picture is inputted to a block division part 11 and is divided into blocks. Next, a PN sequences multiplication part 14 performs spread spectrum to a signal in the blocks, that is, multiplies the blocks by a PN sequences. An arbitrary series of the type in which +1 and −1 occur at random such as a series of (+1, +1, −1, +1, −1, −1, +1, −1, +1, . . . ) can be used as the PN sequences. Then, an orthogonal transformation part 12 performs a Walsh Hadamard transformation (WHT) to the product. In a case of a picture G of a block size of 8×8, for example, a value α obtained by the WHT is shown by the following equation.

$$\alpha = UGU$$

$$U = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix}$$ [Numerical equation 1]

By the calculation of the above matrix, α becomes 8×8 coefficients for one block. A coefficient extraction part 13 extracts any one of the coefficients and outputs them as picture feature quantities $R_A[i]$, $R_B[i]$ to a monitoring chamber to be described below, where [i] designates the index of block in the transmitted and received picture frames and $R_A$ and $R_B$ designate picture feature quantities at the points A and B in FIG. 1, respectively.

The picture feature quantities $R_A[i]$, $R_B[i]$ for each block of the transmitting and the receiving picture are transmitted to the monitoring chamber 4. The monitoring chamber 4, as shown in FIG. 1, is constructed of a block degradation calculation part 41, a median filter 42, a degraded block detection part 43 and a degraded region detection part 44.

First, the block degradation calculation part 41 finds the degree of degradation of a block. The degree of degradation of the block, D[i], is defined as follows.

$$D[i]=(R_A[i]-R_B[i])^2$$

The degree of degradation of each block D[i] is thought to estimate the average power (MSE) in the block of the differential signal between the transmitted picture and the received picture. Therefore, in a case where the transmission failure does not occur, the degree of degradation D [i] represents the degradation of the received picture caused by coding noise, while in a case where the transmission failure occurs, it represents the degree of degradation of the picture caused by the error of a compressed bit stream.

In general, it is known that the picture quality degradation caused by encoding tends to be smaller than the picture quality degradation caused by transmission failure. For this reason, in a case where the value of the degree of degradation D[i] exceeds a value that is predicted as the upper limit of the picture quality degradation caused by encoding, it can be determined that the block is degraded by the transmission failure.

However, the degree of degradation D[i] found from the picture feature quantity is an estimated value, so it has a predetermined estimation error. Moreover, as the compression ratio of the picture is increased, the picture quality degradation caused by encoding is increased, so it is difficult to make a distinction between the picture quality degradation caused by encoding and it by the transmission failure.

Hence, in this embodiment, the median filter 42 is applied to the above-mentioned degree of degradation of block D[i]. Hereinafter, the median filter 42 will be described with reference to FIG. 3.

Figure 3:
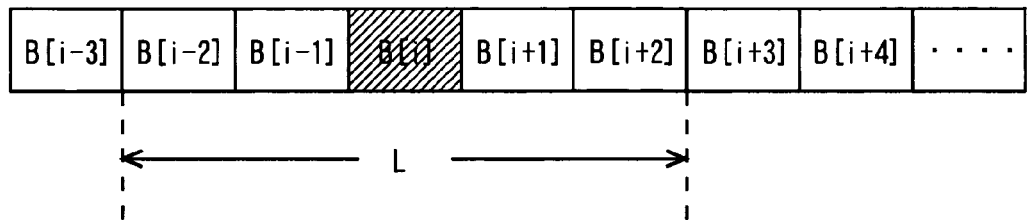
FIG. 3 illustrates an example of operation of a median filter.

The median filer means a processing of defining a set of a pertinent block and its neighboring blocks, selecting a median among a series of values on degrees of degradation of blocks belonging to the set, and providing the median as the degree of degradation of the pertinent block. In FIG. 3, a range L including the i-th block B[i] and two neighboring blocks B[i−2], B[i−1] on its left side and two neighboring blocks B[i+1], B[i+2] on its right side is the above-mentioned set, that is, an object for which the median is found and the value of the center block B[i] is actually updated.

The median filter 42 can be applied for an arbitrary range. However, it is known that, with the proviso that MPEG encoding is applied to the transmission line, degradation tends to extend in a horizontal direction. Hence, it is preferable to set the range as two or three neighboring blocks on its right and left sides of a noticed block. It is for the purpose of facilitating the detection of the degraded region that the median filter 42 is applied as described above.

Figure 4:
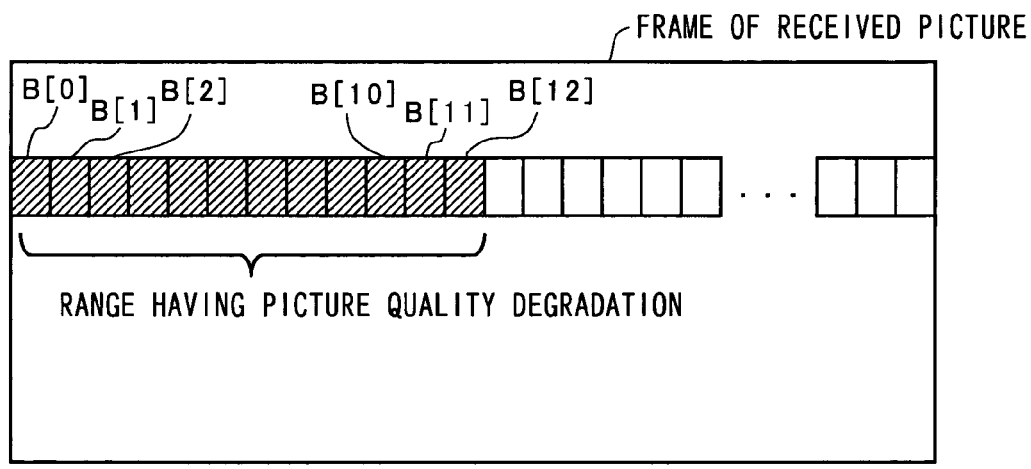
FIG. 4 illustrates the range of degraded region obtained by the processing of the median filter.
Figure 5:
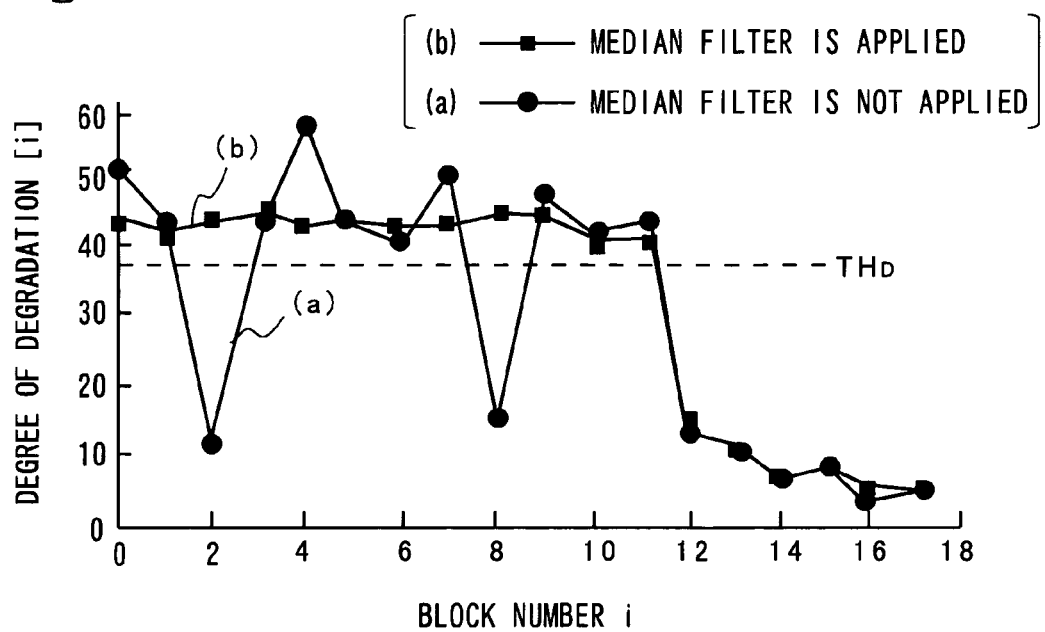
FIG. 5 is a graph showing the degree of degradation before and after the application of the median filter.

Description will be provided by the use of FIG. 4 and FIG. 5. FIG. 4 shows the frame of a received picture and, as shown in FIG. 4, there is a range where 12 blocks (B[0] to B[11]) having picture quality degradation caused by the transmission failure continue in the horizontal direction and it is assumed that the degree of degradation of each block is obtained as a curve (a) in FIG. 5.

As disclosed in the above Japanese Patent Application No. 2002-55333 and the like, the estimation of MSE based on the picture feature quantity is very high in accuracy but includes some estimation error, so the estimation error becomes large depending on the block, which may result in determining by mistake that the picture quality degradation is small. For example, as shown in FIG. 5, the degree of degradation is small for the blocks i=2, i=8 and improper determination may be made at this position, if the median filter is not applied.

Hence, when the median filter 42 is applied to each block, the series of degree of degradation D[i] in FIG. 5 have consecutive high values as shown by a curve line (b) in FIG. 5. Here, in this example, the median is selected from the range including a pertinent block and two neighboring blocks on the right and left sides of the pertinent block.

As described above, improper determination is avoided by the application of the median filter 42 to each block, therefore a range having large picture quality degradation can be integrated into one. Here, in order to apply the median filter to the blocks near and edge of the picture, for example, with respect to the block on the left end in the horizontal direction, it is recommended to determine the median value from a total of three or four blocks including the block on the left end and two or three neighboring blocks on its right side.

Next, the degraded block detection part 43 (see FIG. 1) performs a threshold processing to the degree of picture degradation of a pertinent block to determine a degraded region. Assuming that a threshold is $TH_D$, the degraded region is determined as follows.

$D[i]>TH_D \rightarrow$ it is determined that the pertinent block is degraded $D[i] \leq TH_D \rightarrow$ it is determined that the pertinent block is not degraded As a result, in the example shown in FIG. 5, it is determined that the blocks i=0 to 12 become a degraded region.

Further, the degraded region detection part 44 (see FIG. 1) inspects the continuity of the degraded blocks in the frame. It is expected that the region having large picture quality degradation may become a set of blocks of some numbers by the median filter processing. For this reason, there is a high possibility that an isolated block may be one that merely has large picture quality degradation caused by encoding or one that is judged to have large picture quality degradation by mistake because of estimation error. Hence, successive degraded blocks in the horizontal and/or vertical direction are detected and the region where the number of successive degraded blocks is larger than a given threshold is finally detected as the degraded region. The optimum threshold of detection varies according to the compression ratio of the picture and can be easily set by a person skilled in the art, so an explanation of the optimum threshold of detection is omitted here.

Figure 6:
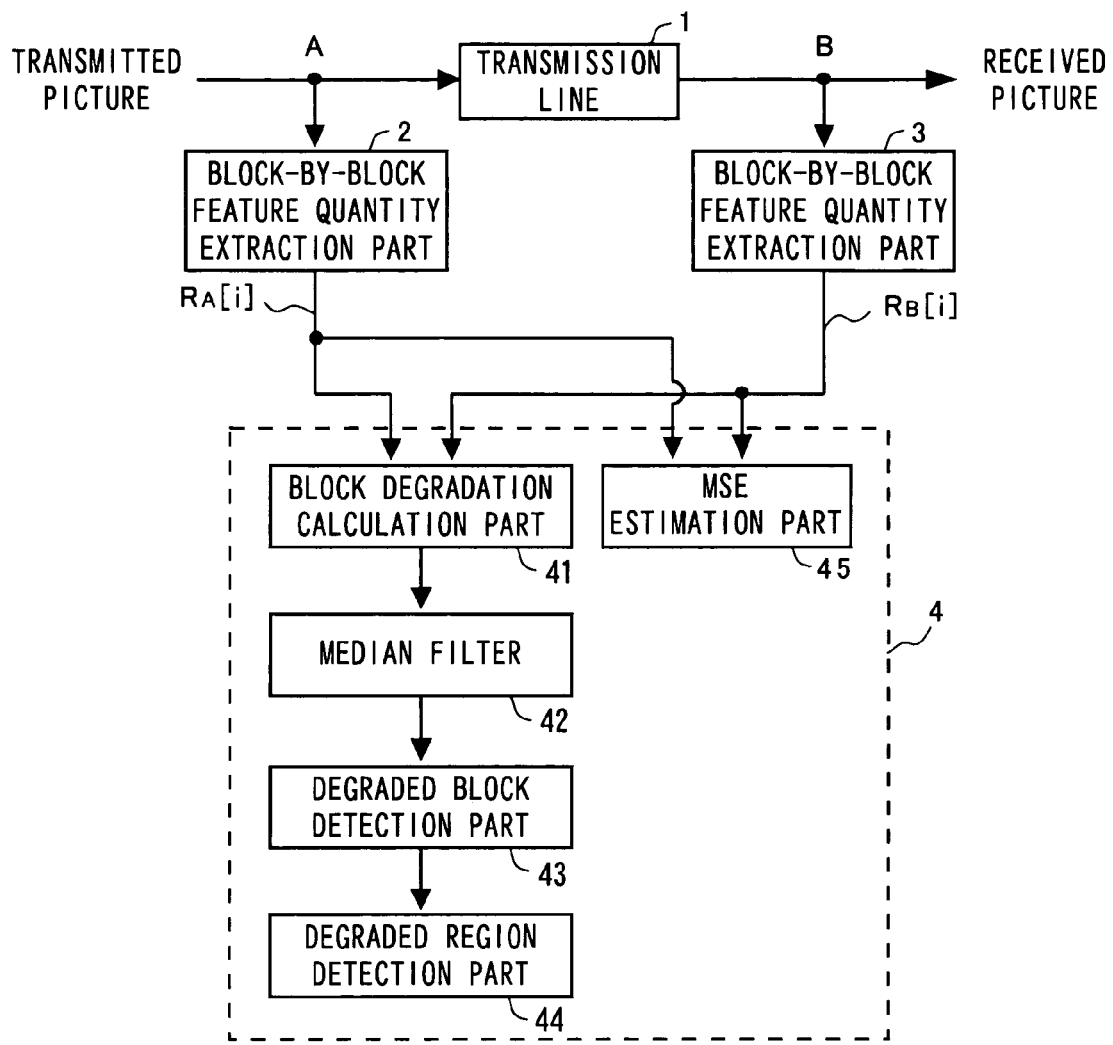
FIG. 6 is a block diagram showing the schematic construction of the second embodiment of the invention.

Next, the second embodiment of the invention will be described with reference to FIG. 6. In this embodiment, the picture quality degradation of a small region can be detected and the picture quality degradation averaged in the frame can be also detected at the same time in the monitoring chamber 4. In the drawing, the same or equivalent parts on FIG. 1 are denoted by the same reference symbols.

Figure 7:
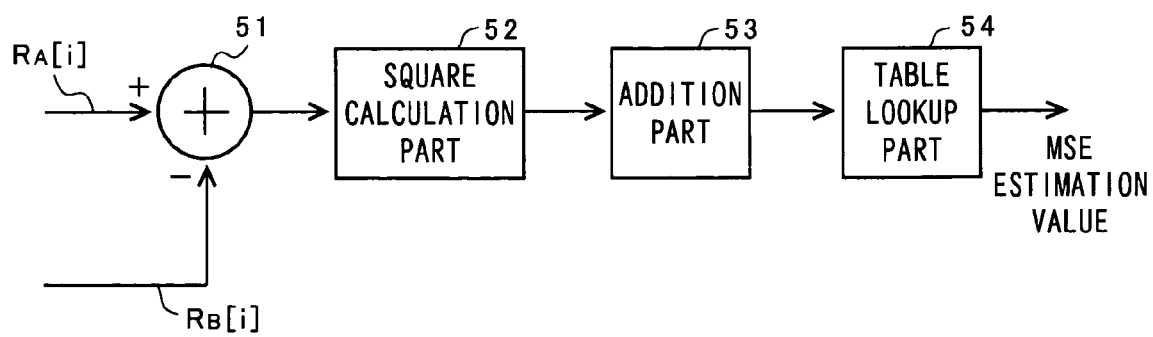
FIG. 7 is a block diagram showing the concrete construction example of an MSE estimation part in FIG. 6.

In this embodiment, the feature quantities extracted by the first and second block-by-block feature quantity extraction parts 2, 3 described above are transmitted to the block degradation calculation part 41 and an MSE estimation part 45. The MSE estimation part 45, as shown in FIG. 7, is constructed of a subtraction part 51, a square calculation part 52, an addition part 53 and a table lookup part 54.

The subtraction part 51 calculates difference in the picture feature quantity between the corresponding blocks on the transmitting and receiving sides and the difference is squared by the square calculation part 52. The addition part 53 adds squared values of all the blocks in one frame. The added value is applied to a table representing the relationship between the added value and the MSE at the table lookup part 54, whereby an MSE estimation value or the picture quality degradation of the frame is obtained.

As described above, according to this embodiment, it is possible to detect the picture quality degradation of the frame and the picture quality degradation of the small region with high accuracy.

As is evident from the above description, according to the invention, it is possible to detect local picture degradation caused by transmission failure in the video transmission. Moreover, since the median filter is employed, the local picture degradation can be detected with high accuracy.

In addition, according to the invention, it is possible to detect the local picture degradation and the picture degradation of the frame at the same time.

What is claimed is:

1. A device for automatically detecting picture degradation caused by video transmission, comprising:
   a first feature quantity extraction part that is provided on a transmitting side and extracts a feature quantity in a small region in a frame;
   a second feature quantity extraction part that is provided on a receiving side and extracts a feature quantity in the small region in the frame; and
   a monitoring chamber that receives the feature quantities extracted by the first and second feature quantity extraction parts through a data circuit,
wherein the monitoring chamber includes:
   a degradation calculation part that compares the feature quantities received from the first and second feature quantity extraction parts and finds a degree of picture quality degradation; and
   a median filter that finds a median of the degree of picture quality degradation among a small region to be noticed and its predetermined neighboring small region to be noticed as the degree of picture quality degradation of the small region to be noticed,
wherein local picture quality degradation of a picture can be detected.

2. The device for automatically detecting picture degradation of claim 1, further comprising a degraded region detection part that detects a region having a larger degree of picture quality degradation than a predetermined threshold, wherein a region where the picture quality degradation is caused by video transmission is detected.

3. The device for automatically detecting picture degradation of claim 1, wherein the first and second feature quantity extraction parts find the feature quantity on the basis of spread spectrum and Walsh Hadamard transformation.

4. The device for automatically detecting picture degradation of claim 2, wherein the first and second feature quantity extraction parts find the feature quantity on the basis of spread spectrum and Walsh Hadamard transformation.

5. The device for automatically detecting picture degradation of claim 1, wherein the median filter finds a median of the degrees of picture quality degradation among the small regions belonging to a range in a horizontal direction.

6. The device for automatically detecting picture degradation of claim 2, wherein the median filter finds a median of the degrees of picture quality degradation among the small regions belonging to a range in a horizontal direction.

7. The device for automatically detecting picture degradation of claim 1, further comprising a picture quality degradation detection part for detecting an average degree of picture quality degradation in a frame, wherein the local picture quality degradation and the picture quality degradation of the frame is detected at the same time.

8. The device for automatically detecting picture degradation of claim 2, further comprising a picture quality degradation detection part for detecting an average degree of picture quality degradation in a frame, wherein the local picture quality degradation and the picture quality degradation of the frame is detected at the same time.

* * * * *